(12) United States Patent
Yim et al.

(10) Patent No.: US 8,321,624 B2
(45) Date of Patent: Nov. 27, 2012

(54) MEMORY DEVICE AND MANAGEMENT METHOD OF MEMORY DEVICE

(75) Inventors: Keun Soo Yim, Yongin-si (KR); Choong Hoon Lee, Hwado-eup Namyangju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 422 days.

(21) Appl. No.: 12/472,705

(22) Filed: May 27, 2009

(65) Prior Publication Data

US 2010/0011156 A1 Jan. 14, 2010

(30) Foreign Application Priority Data

Jul. 10, 2008 (KR) .................. 10-2008-0067033

(51) Int. Cl.
 *G06F 12/02* (2006.01)
(52) U.S. Cl. .................. 711/103; 365/230.06
(58) Field of Classification Search .................. 711/103; 365/230.06
 See application file for complete search history.

(56) References Cited

U.S. PATENT DOCUMENTS

| | | | | |
|---|---|---|---|---|
| 6,961,716 | B2* | 11/2005 | Rhodes | 705/52 |
| 7,184,334 | B2* | 2/2007 | Watanabe et al. | 365/201 |
| 2006/0217923 | A1* | 9/2006 | Ma et al. | 702/179 |
| 2007/0067559 | A1* | 3/2007 | Fujibayashi et al. | 711/112 |
| 2009/0150707 | A1* | 6/2009 | Drucker et al. | 713/401 |
| 2009/0154236 | A1* | 6/2009 | Kozlov | 365/185.03 |

FOREIGN PATENT DOCUMENTS

| | | |
|---|---|---|
| JP | 2002-366420 | 12/2002 |
| JP | 2003-233993 | 8/2003 |
| KR | 10-2005-0034127 | 4/2005 |
| KR | 10-2006-052236 | 5/2006 |
| KR | 10-2007-099234 | 10/2007 |
| KR | 10794664 B1 | 1/2008 |
| WO | WO 2004-040578 | 5/2004 |

* cited by examiner

*Primary Examiner* — Michael Tran
(74) *Attorney, Agent, or Firm* — NSIP Law

(57) ABSTRACT

A memory device includes a plurality of blocks, and the plurality of blocks may include a plurality of pages. The memory device may translate an external physical address into internal physical address using a non-volatile address translation memory. The memory device may access one page of a plurality of pages using the internal physical address.

24 Claims, 14 Drawing Sheets

FIG. 2
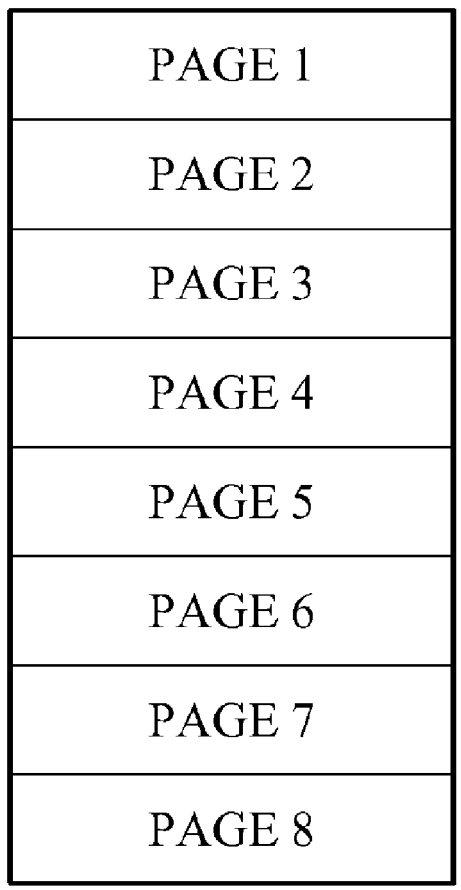
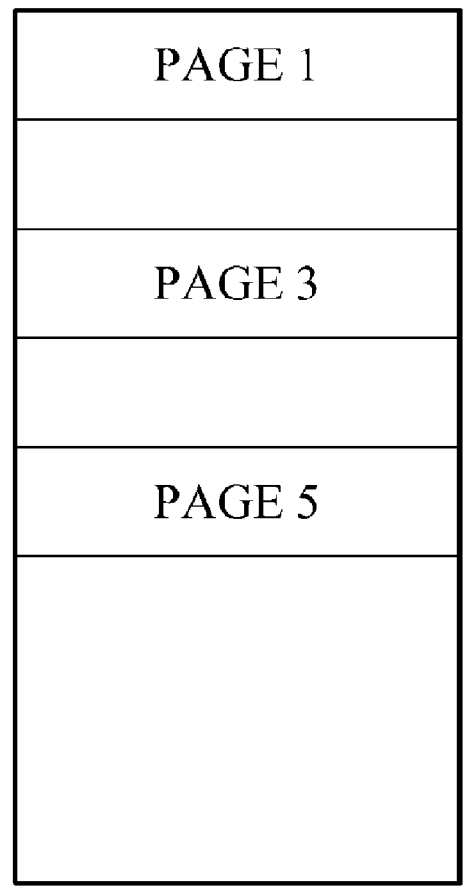
DATA BLOCK
210
LOG BLOCK
220

LOGICAL GROUP 1

| WORD 11 | WORD 12 | • • • |

LOGICAL GROUP 2

| WORD 21 | WORD 22 | • • • |

•
•
•

LOGICAL GROUP N

| WORD N1 | WORD N2 | • • • |

ENTRY 1  1110

| OFFSET 1 | WRITE CYCLE 1 |
|---|---|

ENTRY 2  1120

| OFFSET 2 | WRITE CYCLE 2 |
|---|---|

•
•
•

ENTRY M  1130

| OFFSET M | WRITE CYCLE M |
|---|---|

# MEMORY DEVICE AND MANAGEMENT METHOD OF MEMORY DEVICE

CROSS-REFERENCE TO RELATED APPLICATION

This application claims the benefit under 35 U.S.C. §119 (a) of Korean Patent Application No. 2008-0067033, filed on Jul. 10, 2008 in the Korean Intellectual Property Office, the entire disclosure of which is incorporated herein by reference.

BACKGROUND

1. Field

The following description relates to a memory device and method of managing the memory device.

2. Description of the Related Art

Examples of a storage device to store data include a magnetic disk drive, a semiconductor, and the like. Since physical characteristics are different in each type of storage device, a management method corresponding to the physical characteristic of a particular data storage device is desirable.

A read/write time of a magnetic disk drive may take several milliseconds per kilobyte. The read/write time of the magnetic disk drive may also vary since an arrival time of an arm may be different depending on a physical location of a disk where data is stored.

A host or processor may access a storage device to read data stored in the storage device or to store data in the storage device. The host or processor may use a memory to store a portion of the data stored in the storage device since the host or processor may take a relatively long time to read the data from the storage device.

The host or processor tends to read data that has previously been read, again in a short amount of time later. This tendency is referred to as a temporal locality, and a conventional storage device and management system may use a buffer memory to store data that the host or processor reads from the storage device using the temporal locality.

Also, the host or processor tends to refer to data stored in a nearby location. This tendency is referred to as a spatial locality, and the conventional storage device and management system may read data together with data stored in a successive specific length of space.

SUMMARY

According to one general aspect, there is provided a memory device, including a non-volatile flash memory comprising a plurality of blocks including a plurality of pages, and a non-volatile address translation memory to receive an external physical address, to translate the external physical address into an internal physical address, and to access one page of the plurality of pages using the internal physical address.

The address translation memory may comprise a plurality of entries to access one entry of the plurality of the entries using the external physical address and to generate an internal physical address corresponding to the external physical address referring to contents stored in the accessed entry.

The address translation memory may store an internal physical address corresponding to the one page of the plurality of pages in each of the plurality of entries.

A number of the plurality of entries may be determined based on a number of pages that one block includes.

The memory device may receive a write operation, store the write operation in an empty page among the plurality of pages, and update, to an internal physical address of a page where data of the write operation is stored, contents stored in an entry accessed using an external physical address of the write operation.

The memory device may update the content stored in the entry accessed using the external physical address of the write operation in parallel with storing the write operation page data in the empty page.

The memory device may receive a read operation from a host or controller, read an internal physical address stored in an entry accessed using an external physical address of the read operation, read data stored in a page corresponding to the read internal physical address among the plurality of pages, and output the read data to the host or controller.

The memory device may access the non-volatile memory in parallel with accessing an entry of the address translation memory.

The memory device may erase an entry corresponding to a block to be erased from among entries of the address translation memory in response to receiving an erase operation to perform erasing of at least one block from among the plurality of blocks.

The memory device may erase an entry corresponding to the block to be erased in parallel with erasing at least one block from among the plurality of blocks.

The address translation memory may be a non-volatile memory that is randomly accessible in byte units or word units.

Each of the plurality of pages may be a set of memory cells where data is simultaneously programmed, and each of the plurality of blocks may be a set of memory cells from which data is simultaneously erased.

In another general aspect, there is provided a memory device, including a non-volatile data memory that is randomly accessible in word units, wherein the data memory is divided into at least one logic group including a plurality of words and statistical information is managed with respect to each of the at least one logic group, the statistical information being related to a write cycle number of the words included in each of the at least one logic group.

The statistical information may include a mean, a maximum value, and a deviation of the write cycle number of the words included in each of the at least one logic group.

The memory device may select a first logic group having a highest mean of write cycle numbers of included words among the at least one logic group, selects a second logic group having a lowest mean of write cycle numbers of included words among the at least one logic group, and exchanges data and address between the first logic group and second logic group.

The memory device may select a first logic group having a lowest deviation between write cycle numbers of included words among the at least one logic group, select a second logic group having a highest deviation between write cycle numbers of included words, and exchange an address and data between the first logic group and second logic group.

The memory device may select a first logic group having a highest maximum value of write cycle numbers of included words among the at least one logic group, select a second logic group having a lowest maximum value of write cycle numbers of included words among the at least one logic group, and exchange data and an address between the first logic group and the second logic group.

The memory device may further comprise at least one lookup table, wherein the at least one lookup table corresponds to any one logic group of the at least one logic group and includes at least one entry storing an offset and write cycle number of at least one word of words included in the corresponding logic group, the offset indicating a relative address of each of the at least one word in the corresponding logic group.

The offset may update a stored write cycle number in response to one of the at least one lookup table corresponding to a logic group corresponding to a write operation and an offset of a word corresponding to the write operation being stored in the corresponding lookup table.

The memory device may select one of entries of the corresponding lookup table, store the offset of the word corresponding to the write operation in the selected entry, and store a value of adding one to a maximum value of a write cycle number of the logical group corresponding to the write operation in the selected entry, in response to one of the at least one lookup table corresponding to a logic group corresponding to a write operation and an offset of a word corresponding to the write operation being not stored in the corresponding lookup table.

The memory device may select one entry of entries of the corresponding lookup table based on a random sequence or spatial/temporal locality, and set a write cycle number stored in the selected entry as the maximum write cycle number of the logic group corresponding to the write operation in response to the selected entry being not empty and the write cycle number stored in the selected entry being higher than the maximum write cycle number of the logic group corresponding to the write operation.

In response to a lookup table corresponding to a logic group corresponding to a write operation not existing among the at least one lookup table, the memory device may select one lookup table of the at least one lookup table, set a maximum write cycle number stored in an entry of the selected lookup table as a maximum write cycle number of a logical group corresponding to the selected lookup table, set the selected lookup table to be corresponding to the logic group of the write operation, store an offset of a word corresponding to the write operation in the selected lookup table, and store a value of adding one to a maximum write cycle number of the logical group corresponding to the write operation in an entry storing the offset.

A number of the at least one lookup table may be equal to or less than a number of the at least one logic group, and a number of entries of each of the at least one lookup table may be equal to or less than a number of words included in each of the at least one logic group.

The memory device may store statistical information related to a write cycle number of words included in each of the at least one logic group as metadata with respect to each of the at least one logic group.

Other features will become apparent to those skilled in the art from the following detailed description, which, taken in conjunction with the attached drawings, discloses exemplary embodiments.

BRIEF DESCRIPTION OF THE DRAWINGS

FIG. 2 is a block diagram illustrating a data program process that the memory device of FIG. 1 performs according to an exemplary embodiment.

FIG. 10 is a diagram illustrating an example of a data memory of FIG. 9 according to an exemplary embodiment.

FIG. 11 is a diagram illustrating an example of a lookup table (1) of FIG. 9 according to an exemplary embodiment.

Throughout the drawings and the detailed description, unless otherwise described, the same drawing reference numerals will be understood to refer to the same elements, features, and structures. The elements may be exaggerated for clarity and convenience.

DETAILED DESCRIPTION

The following detailed description is provided to assist the reader in gaining a comprehensive understanding of the methods, apparatuses and/or systems described herein. Accordingly, various changes, modifications, and equivalents of the systems, apparatuses and/or methods described herein will be suggested to those of ordinary skill in the art. Also, descriptions of well-known functions and constructions are omitted to increase clarity and conciseness.

Figure 1:
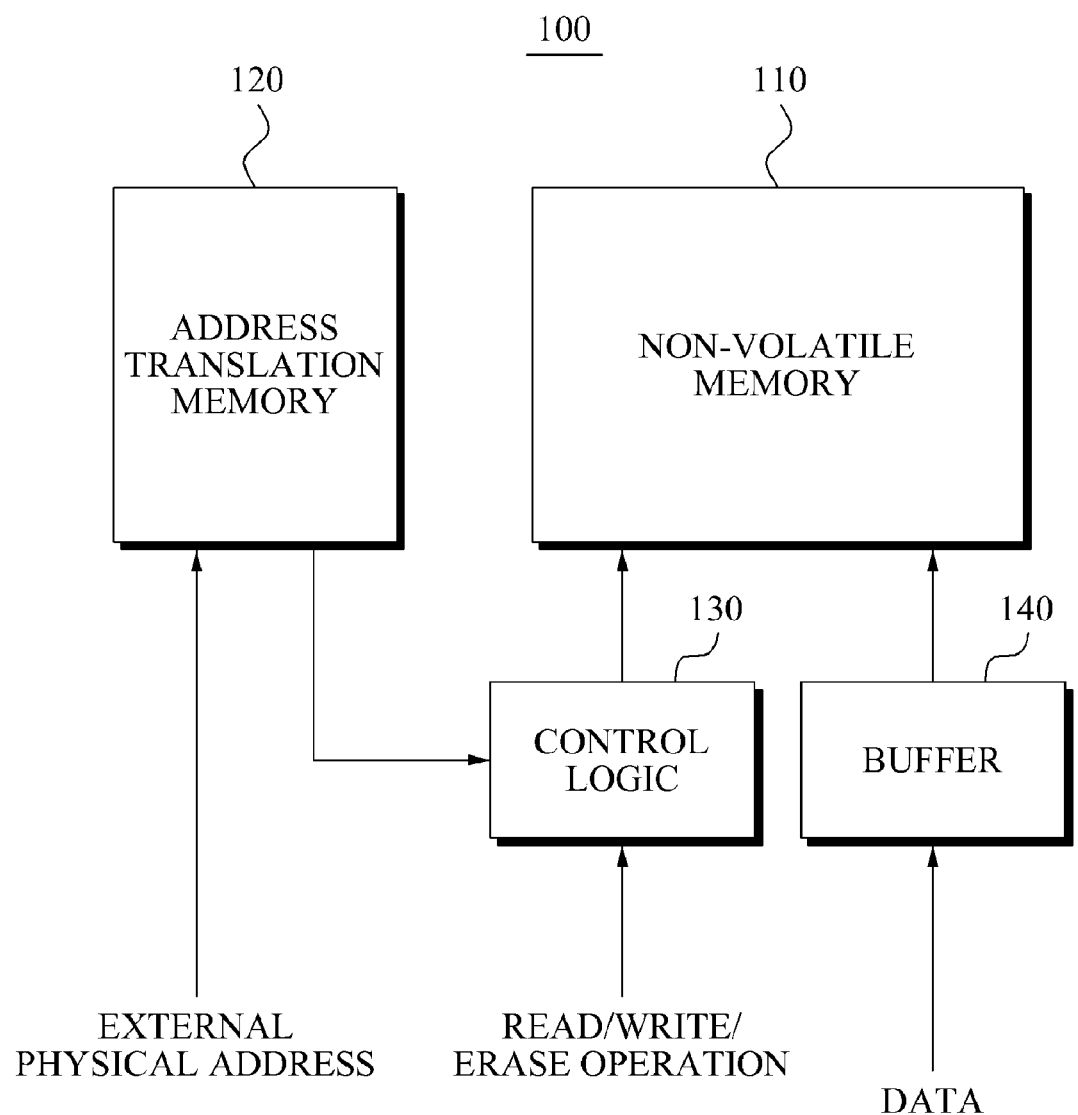
FIG. 1 is a block diagram illustrating a memory device according to an exemplary embodiment.

FIG. 1 illustrates a memory device 100 according to an exemplary embodiment.

Referring to FIG. 1, the memory device 100 includes a non-volatile memory 110 and an address translation memory 120, and may further include a control logic 130 and a buffer 140.

The non-volatile memory 110 may include a plurality of blocks. The plurality of blocks may include a plurality of pages and the plurality of pages may include a plurality of memory cells.

A program embodied upon a computer readable medium may execute instructions to perform a process in which the memory device 100 stores data in each memory cell of the non-volatile memory 110. The program process may take more time than a process of reading data from each memory cell.

Where new data is required to be stored in a memory cell where data is stored among memory cells of the non-volatile memory 110, the memory device 100 may erase the memory cell where data is stored and may store the new data. This erase process may take more time than the program process.

The memory device 100 may simultaneously perform the program process with respect to memory cells included in one page. The page may be recognized, externally from the memory device 100, as a minimum unit of storing data.

The memory device 100 may simultaneously perform the erase process with respect to memory cells included in one block. The block may be recognized, externally from the memory device 100, as a minimum unit of erasing data.

According to another embodiment, the control logic 130 may perform the program process of data in the non-volatile memory 110 in page units. In this case, the control logic 130 may erase data stored in the non-volatile memory 110 in block units. The memory device 100 may be controlled to make it impossible for an external host or controller of the memory device 100 to recognize a configuration of the block or page of the non-volatile memory 110.

The address translation memory 120 may receive an external physical address from a processor, the external host, or controller of the memory device 100. The address translation memory 120 may translate the external physical address into an internal physical address. The memory device 100 may access the non-volatile memory 110 using the internal physical address. The internal physical address may correspond to each of the plurality of pages of the non-volatile memory 110. The control logic 130 may access any one page of the plurality of pages of the non-volatile memory 110 using the internal physical address.

The control logic 130 may receive read, write, and/or erase operations from the external host, processor, or controller of the memory device 100. Also, the control logic 130 may access any one page of the plurality of pages of the non-volatile memory 110 using the internal physical address corresponding to the received operation.

The buffer 140 may receive and store data corresponding to the write operation from the external host, process, or controller of the memory device 100. The buffer 140 may maintain the data corresponding to the write operation while a program process with respect to the non-volatile memory 100 is performed by the memory device 100.

The address translation memory 120 may be a non-volatile memory. The address translation memory 120 may be a non-volatile Random Access Memory (RAM) that is randomly accessible in byte units or word units. Examples of the non-volatile RAM include Phase Shift Random Access Memory (PRAM), Magnetic Random Access Memory (MRAM), and the like.

The address translation memory 120 may include a plurality of entries. The address translation memory 120 may access any one entry of the plurality of entries using the external physical address.

The external physical address may include a block field indicating a block. The memory device 100 may select any one block from among the plurality of blocks of the non volatile memory 110 based on a value of the block field and access the selected block. The external physical address may include a page field indicating a page. The memory device 100 may select any one page of a plurality of pages included in the selected block based on the value of the page field.

The address translation memory 120 may include an exclusively assigned region with respect to each of the plurality of blocks of the non-volatile memory 110. For example, where the non-volatile memory 110 includes 256 blocks, the address translation memory 120 may include 256 regions and each region may exclusively correspond to any one block of the plurality of blocks.

The address translation memory 120 may select a region corresponding to the selected block using the block field of the external physical address. The address translation memory 120 may select any one entry from among entries included in the selected region using the page field of the external physical address. The address translation memory 120 may access the selected entry and may read contents stored in the accessed entry. The address translation memory 120 may generate the internal physical address corresponding to the external physical address referring to the read contents.

In this case, each entry may store contents corresponding to a page field of the internal physical address. The address translation memory 120 may combine contents read from the block field of the external physical address and access entry and generate the internal physical address.

According to another embodiment, the address translation memory 120 may be included in the controller of the memory device 100. In this case, the controller may be included internally in the memory device 100 or external from the memory device 100.

FIG. 2 illustrates a data program process performed by the memory device 100 of FIG. 1 according to an exemplary embodiment.

Referring to FIG. 2, the non-volatile memory 110 includes a data block 210 and a log block 220. A data program process corresponding to address space formed by an external physical address is illustrated in FIG. 2.

The data block 210 may store data corresponding to pages 1 through 8.

Where data of page 1, page 3, and page 5 is updated by an external host, a processor, or a controller of the memory device, the memory device 100 may program the updated data of page 1, page 3, and page 5 to the log block 220.

The memory device 100 may program the updated data of page 1 to the log block 220, store metadata indicating that the programmed data of page 1 is an updated version of page 1 of the data block 210, and may, for example, subsequently store metadata indicating that page 1 of the data block 210 is obsolete data.

In the similar manner, the memory device 100 may program updated data of page 3 to the log block 220, store metadata indicating that the programmed data of page 3 is an updated version of page 3, and store metadata indicating page 3 of the data block 210 is obsolete data.

The memory device may translate the external physical address into an internal physical address, provide address space formed by the external physical address with respect to the external host, the processor, or the controller of the memory device 100, and manage a non-volatile memory 110 through the internal physical address inside the memory device 100.

The memory device 100 may program updated data of page 1, page 3, and page 5 to the log block 220 irrespective of an update order of data of page 1, page 3, and page 5 through the external host, the processor, or the controller of the memory device 100.

For example, where page 5 is updated after page 3 is updated and page 1 is updated after page 5 is updated, the memory device 100 may program updated page 5 to the log block 220 after programming updated page 3 to the log block 220 and may program updated page 1 to the log block 220 after programming updated page 5 to the log block 220.

Although page 3, page 5, and page 1 are sequentially programmed to an adjacent internal physical page, the memory device 100 may provide the log block 220 where each page is programmed in place, to the external host, the process, or the controller of the memory device.

Figure 3:
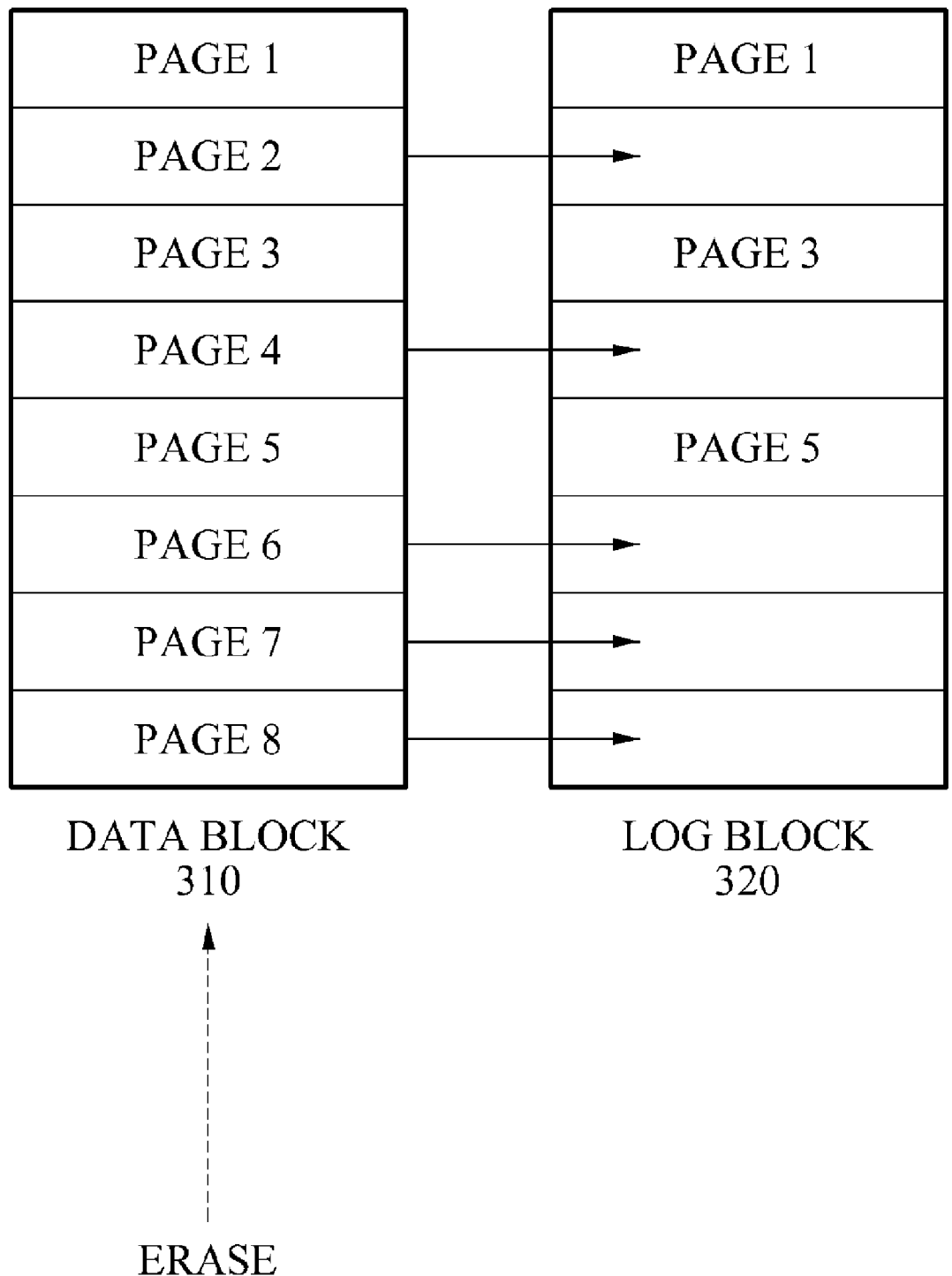
FIG. 3 is a block diagram illustrating a garbage collection process that the memory device of FIG. 1 performs according to an exemplary embodiment.

FIG. 3 illustrates a garbage collection process performed by the memory device 100 of FIG. 1 according to an exemplary embodiment.

Referring to FIG. 3, a merge operation of a data block 310 and a log block 320 and a garbage collection process are illustrated.

As described in FIG. 2, it is assumed that page 1, page 3, and page 5 of the data block 310 are updated and updated page 1, updated page 3, and updated page 5 are programmed to the log block 320.

The memory device 100 may copy data stored in the data block 310 to the log block 320. In this case, the memory device 100 may not copy obsolete page 1, page 3, and page 5 from among data stored in the data block 310.

The memory device 100 may copy page 2, page 4, page 6, page 7, and page 8 to the log block 320 from among data stored in the data block 310, and then erase data stored in the data block 310. The memory device 100 may set the log block 320 as a new data block, and store metadata indicating that the log block 320 is a new data block.

The memory device 100 may translate an external physical address into an internal physical address and may manage pages of the log block 320 using the internal physical address, thereby reducing a number of copy operations while performing a garbage collection process. The memory device 100 may simplify the garbage collection process, and thereby may reduce a time taken to perform the garbage collection process.

The controller of the memory device 100 may set the data block 310 as a source and the log block 320 as a target in the garbage collection process. The controller of the memory device 100 may simplify the garbage collection process as a process of copying data from the source to the target.

The memory device 100 may copy data of the data block 310 to the log block 320, and thereby may reduce a number of physical blocks required in the garbage collection process. The memory device 100 may reduce a number of occupied blocks, and thereby may reduce a number of times the garbage collection is to be performed.

The memory device 100 may generate an internal physical address different from the external physical address. For example, an actual storing order of the pages stored in the data block 310 may be different from the external physical address. The memory device 100 may provide a consistent external physical address to the controller of the memory device 100 irrespective of storing order of data to the data block 310 and log block 320 of the memory device 100.

The memory device 100 may sequentially store an updated page to the log block 320 according to an updating order of the page, or the memory device 100 may store the updated page to the log block 320 considering a status of the log block 320.

The controller of the memory device 100 may not consider an actual storing order when performing the garbage collection. The controller of the memory device 100 may perform the garbage collection only using the external physical address. The controller of the memory device 100 may manage the memory device 100 only using the external physical address. The memory device 100 may reduce a load to manage the controller of the memory device 100.

Even where a random write operation frequently occurs, the controller of the memory device 100 may manage the memory device 100 irrespective of randomness of the write operation. It is because the memory device 100 may store a page in place, the page being updated through a mapping between the external physical address and the internal physical address.

Figure 4:
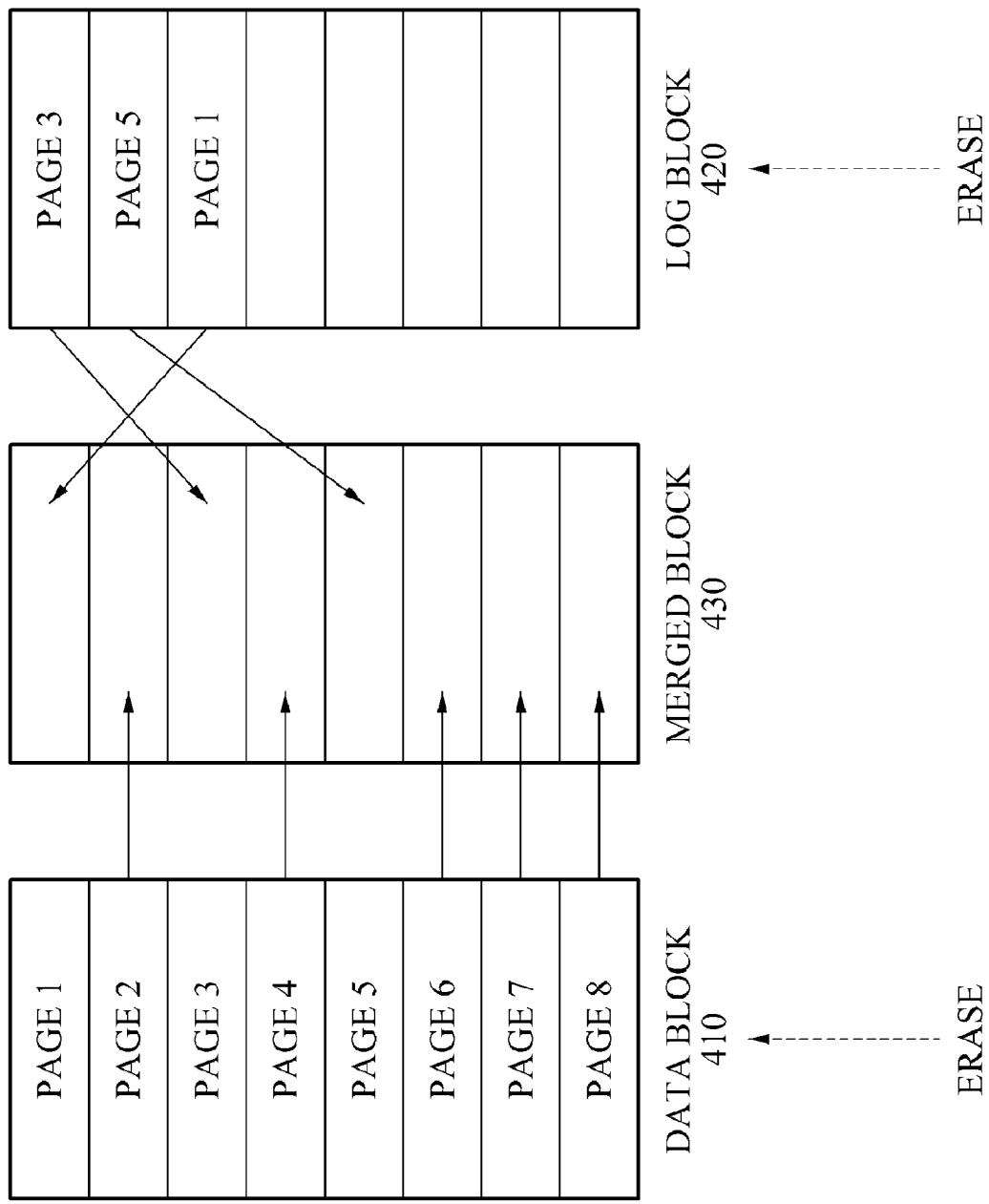
FIG. 4 is a block diagram illustrating an example of a garbage collection process of a NAND Flash Memory according to an exemplary embodiment.

FIG. 4 illustrates a garbage collection process of a NAND Flash Memory according to an exemplary embodiment.

Referring to FIG. 4, the NAND Flash Memory may merge data stored in a data block 410 and a log block 420 into a merged block 430.

It is assumed that page 1, page 3, and page 5 of the data block 410 are updated and updated page 1, page 3, and page 5 are programmed to the log block 420.

In the log block 420, page 3, page 5, and page 1 may be sequentially stored according to an updating order. The NAND Flash Memory may store metadata indicating that page 3 stored in the log block 420 is an updated version of page 3 stored in the data block 410, and store metadata indicating that page 3 stored in the data block 410 is an obsolete version.

In the same manner, the NAND Flash Memory may store metadata indicating that page 1 and page 5 stored in the data block 410 is an obsolete version.

The NAND Flash Memory may copy page 3 stored in the log block 420 to a third location of the merge block 430. The NAND Flash Memory may copy page 5 stored in the log block 420 to a fifth location of the merge block 430, and may also copy page 1 stored in the log block 420 to a first location of the merge block 430.

The NAND Flash Memory may copy page 2, page 4, page 6, page 7, and page 8 of the data block 410 to the merge block 430. All of page 2, page 4, page 6, page 7, and page 8 of the data block 410 are not obsolete versions.

The NAND Flash Memory may erase data of the data block 410 and the log block 420 after copying the data of the data block 410 and log block 420 to the merge block 430.

Figure 5:
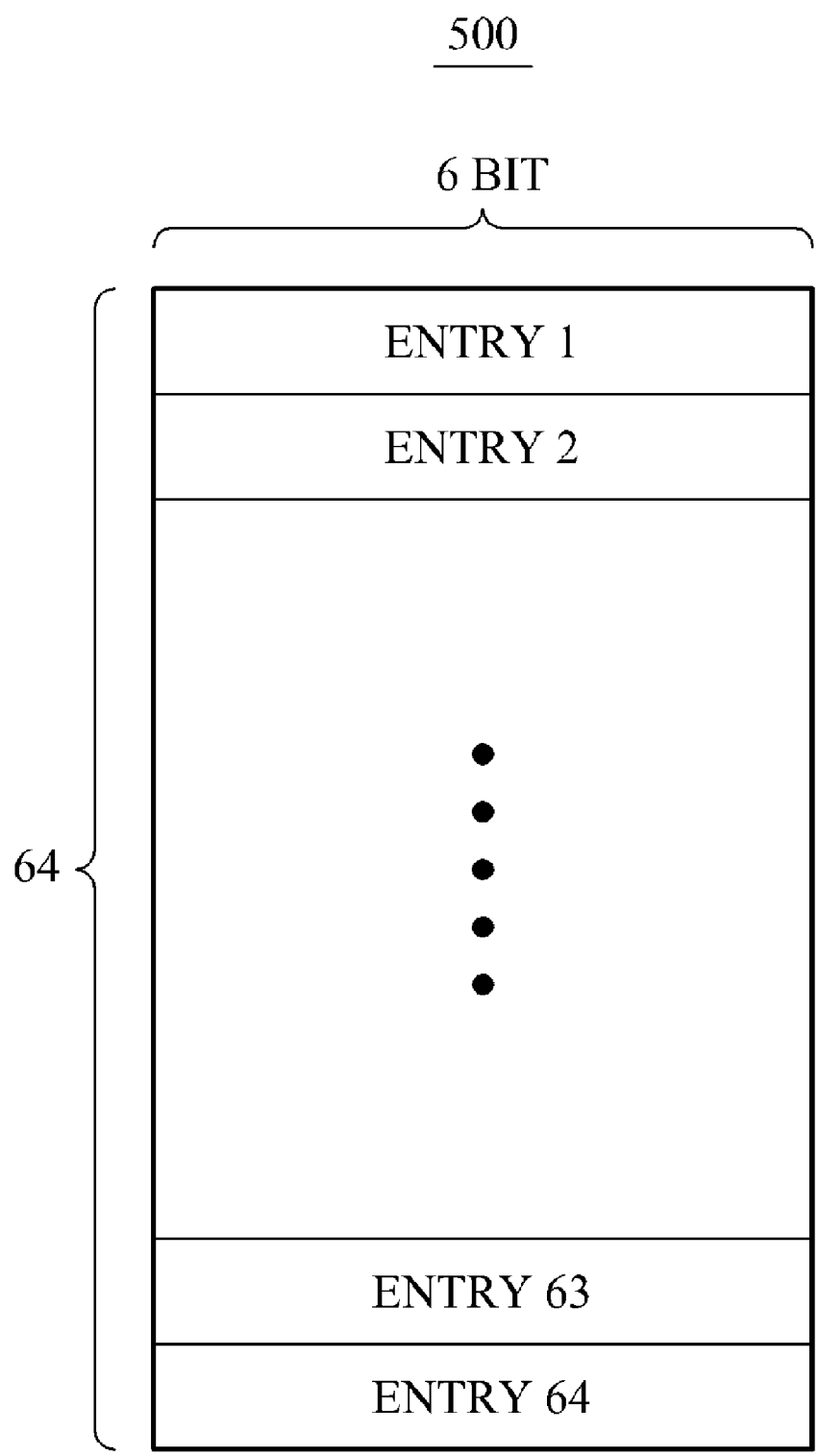
FIG. 5 is a block diagram illustrating an address translation memory according to an exemplary embodiment.

FIG. 5 illustrates an address translation memory 500 according to an exemplary embodiment.

Referring to FIG. 5, the address translation memory 500 include 64 entries. The address translation memory 500 may correspond to one block and the one block may include 64 pages.

Where the one block includes 64 pages, each of the entries may include contents with six bits. In this case, an equation $6=\log_2 64$ is made. Each entry may indicate any one page of 64 pages using the contents of six bits.

For example, where the contents stored in an entry 1 is "001000," the entry 1 may indicate an eighth page of the block and where the content stored in an entry 2 is "001001," the entry 2 may indicate a ninth page of the block. A relative location of each page in the block may be referred to as an offset.

The address translation memory 500 may access any one entry of 64 entries using an external physical address. For example, where the external memory is "000000," the address translation memory 500 may access entry 1. The address translation memory 500 may generate an internal physical address with contents, "001000" stored in the entry 1. In this case, the address translation memory 500 may perform mapping of the external physical address using "000000" and the internal physical address using "001000."

Where the external physical address is "000001," the address translation memory 500 may access the entry 2. The address translation memory 500 may perform mapping of the external physical address using "000001" and the internal physical address using "001001."

Where the external physical address is "111110," the address translation memory 500 may access an entry 63 using the external physical address. Where the external physical address is "111111," the address translation memory 500 may access an entry 64 using the external physical address.

The address translation memory 500 includes 64 entries, the 64 corresponding to a number of pages included in the block, and thereby may perform mapping of an offset of each page included in the block with the external physical address.

The address translation memory 500 may be an extremely small size compared to a size of a corresponding block. The address translation memory 500 may translate an external physical address of the corresponding block into an internal physical address, although the size of the address translation memory 500 is relatively small. For example, where a size of one page is 4 kilobyte, the size of the corresponding block is 64×4 kilobyte=256 kilobytes. In this case, the size of the address translation memory 500 is 64×6 bits=48 bytes. The size of the address translation memory 500 is 1.83% of the size of the corresponding block (48 bytes/256 kilobytes× 100=1.83%).

Figure 6:
FIG. 6 is a diagram illustrating an example of a write operation of the memory device of FIG. 1 according to an exemplary embodiment.

FIG. 6 illustrates a write operation of the memory device 100 of FIG. 1 according to an exemplary embodiment.

Referring to FIG. 6, a waveform 610 illustrates an operation of an address translation memory 120 and a waveform 620 illustrates an operation of a non-volatile memory 110.

Where the memory device 100 receives a write operation or write command from a controller, the memory device 100 may search for an empty page from among a plurality of pages of the non-volatile memory 110. The memory device 100 may select one empty page from among at least one empty page.

The non-volatile memory 110 may store data of the write operation in the selected page. The memory device 100 may generate an internal physical address of the write operation with an offset of the selected page. The memory device 100 may access one entry among entries of an address translation memory 120 using an external physical address of the write operation. The address translation memory 120 may store the internal physical address of the write operation in the accessed entry, and thereby may update contents of the accessed entry.

The waveform 610 indicates a process that the address translation memory 120 updates the contents of the accessed entry. The waveform 620 indicates a process that the non-volatile memory 110 stores the data of the write operation in the selected page.

Referring to the waveform 610 and the waveform 620, the address translation memory 120 may update the contents of the accessed entry while the non-volatile memory 110 stores data of the write operation in the selected page. The address translation memory 120 may update contents of the entry in parallel with the storing operation of the non-volatile memory 110.

The memory device 100 may access the address translation memory 120 and the non-volatile memory 110 in parallel, and thereby may reduce time taken to perform the write operation.

Figure 7:
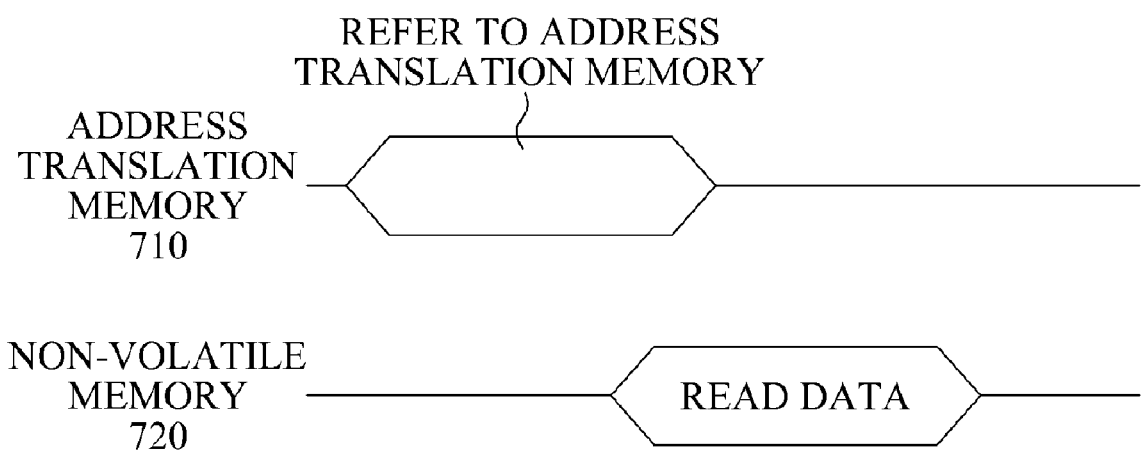
FIG. 7 is a diagram illustrating an example of a read operation of the memory device of FIG. 1 according to an exemplary embodiment.

FIG. 7 illustrates a read operation of the memory device 100 of FIG. 1 according to an exemplary embodiment.

Referring to FIG. 7, a waveform 710 illustrates an operation of an address translation memory 120 and a waveform 720 illustrates an operation of a non-volatile memory 110.

Where the memory device 100 receives a read operation or read command from a controller, the memory device 100 may access one entry of a plurality of entries of the address translation memory 120 using an external physical address of the read operation. The memory device 100 may read internal physical address corresponding to the external physical address of the read operation referring to contents of the accessed entry.

The memory device 100 may search to find a page corresponding to the internal physical address from among a plurality of pages of the non-volatile memory 110 and read data stored in a retrieval page. The memory device 100 may output the read data to the controller.

The waveform 710 indicates a process that the memory device 100 refers to the contents of the entry of the address translation memory 120. The waveform 720 indicates a process that the memory device 100 reads data of the read operation from the non-volatile memory 110.

Referring to the waveform 710 and waveform 720, the memory device 100 may access the non-volatile memory 110 in parallel with referring to the contents of the address translation memory 120.

The memory device 100 may access the address translation memory 120 and the non-volatile memory 110 in parallel, and thereby may reduce time taken to perform the read operation.

Figure 8:
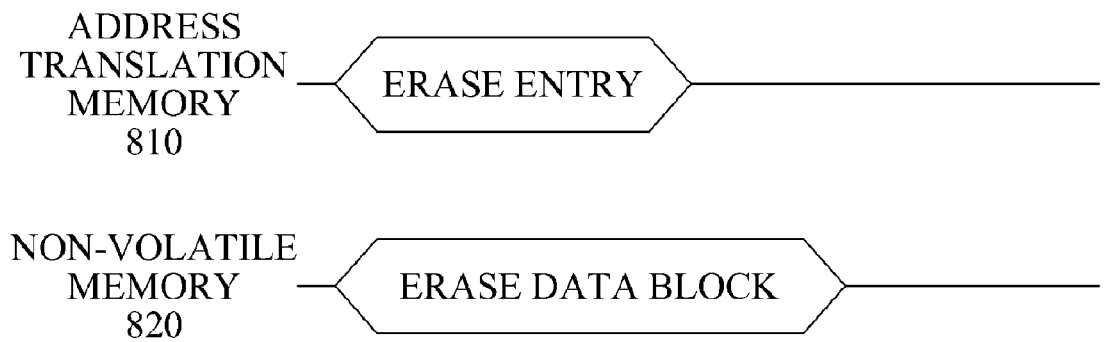
FIG. 8 is a diagram illustrating an example of an erase operation of the memory device of FIG. 1 according to an exemplary embodiment.

FIG. 8 illustrates an erase operation of the memory device 100 of FIG. 1 according to an exemplary embodiment.

Referring to FIG. 8, a waveform 810 illustrates an operation of the address translation memory 120 and a waveform 820 illustrates an operation of the non-volatile memory 110.

An erase operation indicates an operation that erases at least one block of a plurality of blocks of the non-volatile memory 110. Where the erase operation is received, the memory device 100 may erase an entry corresponding to a block to be erased from among entries of the address translation memory 120.

The waveform 810 indicates a process that the memory device 100 erases contents of entry of the address translation memory 120. The waveform 820 indicates a process in which the memory device 100 erases data of a selected block from among data blocks of the non-volatile memory 110.

Referring to the waveforms 810 and 820, the memory device 100 may erase the data of the selected block from among the blocks of the non-volatile memory 110 in parallel with erasing the entry of the address translation memory 120.

The memory device 100 may access the address translation memory 120 and the non-volatile memory 110 in parallel, and thereby may reduce time taken to perform the erase operation.

Figure 9:
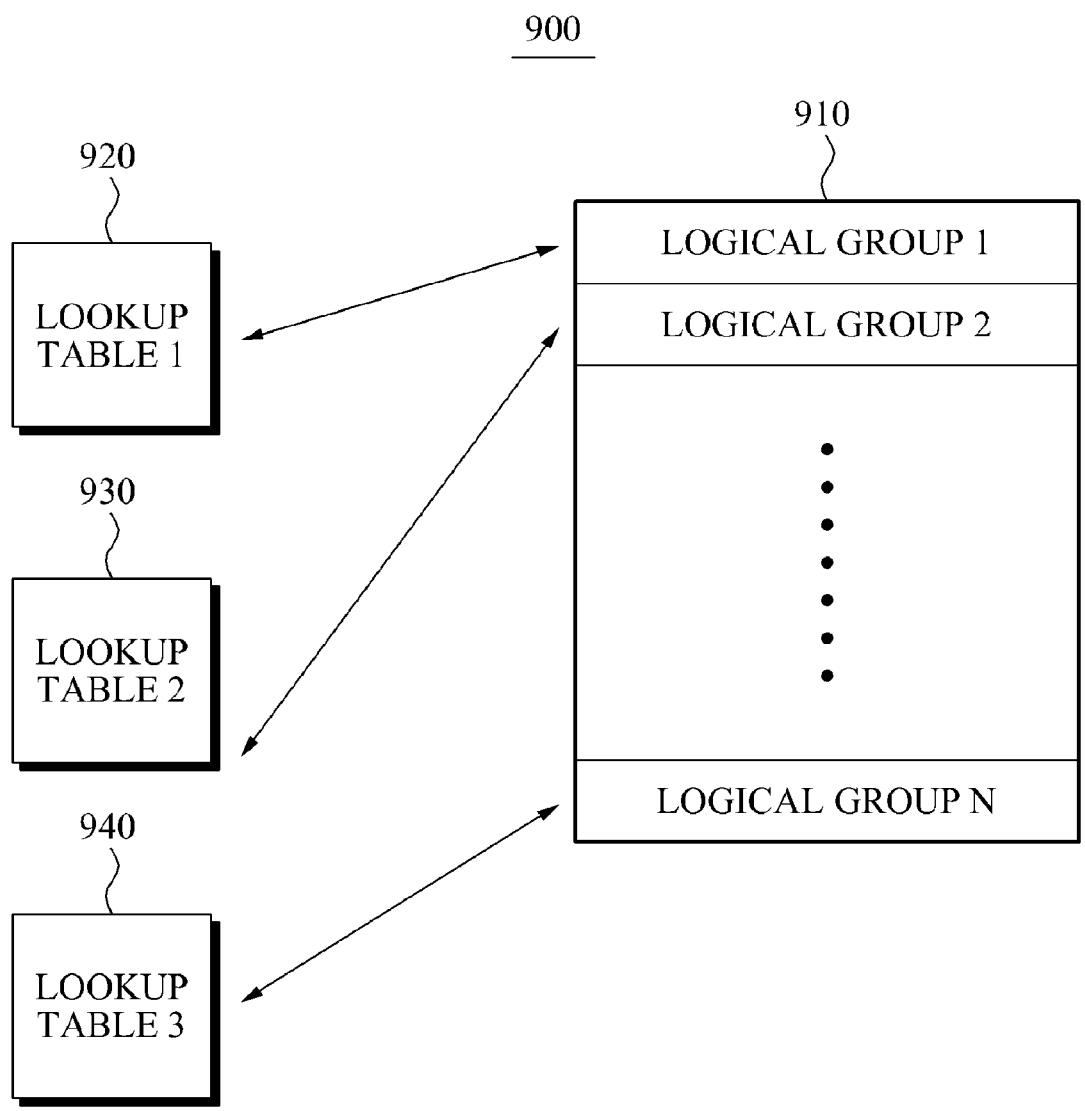
FIG. 9 is a block diagram illustrating a memory device according to an exemplary embodiment.

FIG. 9 illustrates a memory device 900 according to an exemplary embodiment.

Referring to FIG. 9, the memory device 900 includes a data memory 910.

The memory device 900 may further include a lookup table (1) 920, lookup table (2) 930, and lookup table (3) 940

The data memory 910 may be a non-volatile and randomly accessible in byte units or word units. The memory device 900 may divide the data memory 910 into at least one logic group. In FIG. 9, the data memory 910 includes N logic groups. Each of the N logic groups may include a plurality of words.

Lookup table (1) 920 may correspond to a logic group 1 and may manage statistical information related to write cycle numbers of words included in the logic group 1.

Lookup table (2) 930 may correspond to a logic group 2 and may manage statistical information related to write cycle numbers of words included in the logic group 2.

Lookup table (3) 940 may correspond to a logic group N and may manage statistical information related to write cycle numbers of words included in the logic group N.

The statistical information may include a mean, a maximum value, and a deviation of the write cycle numbers of words included in each of the logic groups 1 through N.

The memory device 900 may store the information related to the write cycle numbers of words included in each of the logic groups as metadata with respect to each logic group.

A number of the lookup table is equal to or less than a number of the logic groups The memory device 900 may select a first logic group from among the at least one logic group. The first logic group may be a logic group having a highest mean of write cycle numbers of included words. The memory device 900 may select a second logic group from among the at least one logic group. The second logic group may be a logic group having a lowest mean of write cycle numbers of included words. The memory device 900 may exchange data between the first logic group and the second logic group, and may exchange an address between the first logic group and the second logic group.

According to another exemplary embodiment, the memory device 900 may select a first logic group from among the at least one logic group. The first logic group may be a logic group having a lowest deviation of a write cycle number of included words. The memory device 900 may select a second logic group from among the at least one logic group. The second logic group may be a logic group having a highest deviation of write cycle numbers of included words. The memory device 900 may exchange data between the first logic group and the second logic group, and may exchange an address between the first logic group and the second logic group.

According to another exemplary embodiment, the memory device 900 may select a first logic group from among the at least one logic group. The first logic group may be a logic group having a highest maximum value of write cycle numbers of included words. The memory device 900 may select a second logic group from among the at least one logic group. The second logic group may be a logic group having a lowest maximum value of write cycle numbers of included words. The memory device 900 may exchange data between the first logic group and the second logic group, and may exchange an address between the first logic group and the second logic group.

The data memory 910 may include a plurality of memory cells and the plurality memory cells may form an array expressed through rows and columns.

Since the data memory 910 is a type of non-volatile memory, as a write cycle number increases, a characteristic of a memory cell may be degraded. The memory device 900 may manage a write cycle number of each memory cell to make the characteristic of each memory cell even. This management may be referred to as wear leveling.

Since the data memory 910 is a memory which is randomly accessible in word units or byte units, the wear leveling is also performed in word units or byte units. However, where the data memory 910 includes a significant amount of words or bytes, management overhead with respect to the wear leveling may significantly increase.

The memory device 900 may divide the data memory 910 into logic groups and perform wear leveling with respect to each logic group, thereby reducing the management overhead.

The memory device 900 may exchange an address and data between the first logic group having a high average write cycle number and the second logic group having low average write cycle number, and thereby may equalize the write cycle number of the first and second logic group. A host or a processor may have a high probability of frequently accessing data stored in the first logic group before exchanging. After exchanging, the host and the processor have a high probability of frequently accessing data stored in the second logic group. Accordingly, after the exchanging, the write cycle number of the second logic group increases, thereby being similar to write cycle number of the first logic group.

The memory device 900 may perform wear leveling through exchanging the data and address between logic groups having opposite tendencies. In this case, statistical information corresponding to the write cycle number is not exchanged with the data and address where the exchange is performed.

The memory device 900 may increase the accuracy of the wear leveling by adjusting a size of the logic group. Where the size of the logic group is adjusted to be small, the accuracy of the wear leveling may increase, and where the size of the logic group is adjusted to be large, the accuracy of the wear leveling may decrease and may decrease overhead.

The size of the logic group may be adjusted to be similar to a size of a page.

FIG. 10 illustrates the data memory 910 of FIG. 9 in detail.

Referring to FIG. 10, the data memory 910 includes N logic groups. A single logic group may include a plurality of words.

For example, a logic group 1 may include word 11 and word 12. Word 11 is a first word among words included in the logic group 1. In this case, word 11 may have an offset of "0." The offset indicates a relative address of each word in the logic group. Word 12 is a second word among words included in the logic group 1. Word 12 may have an offset of "1."

The logic group 2 may include word 21 and word 22. Word 21 is a first word among words included in the logic group 2. Word 21 may have an offset of "0." Word 22 is a second word of words included in the logic group 2. Word 22 may have an offset of "1."

Logic group N may include word N1 and word N2. Word N1 is a first word among words included in the logic group N. Word N1 may have an offset of "0." Word N2 is a second word among words included in the logic group N. Word N2 may have an offset of "1."

FIG. 11 illustrates the lookup table (1) 920 of FIG. 9 in detail.

Referring to FIG. 11, the lookup table (1) 920 includes M entries. Each entry may include an offset and write cycle number.

For example, entry (1) 1110 may include an offset 1 which is an offset of a first word and a write cycle number 1 which is a write cycle number of the first word. The first word may be word 11, word 12, or another word.

Entry (2) 1120 may include an offset 2 which is an offset of a second word and a write cycle number 2 which is a write cycle number of the second word.

Entry (M) 1130 may include an offset M and write cycle number M. The offset is an offset of an $M^{th}$ word and the write cycle number M is a write cycle number of the $M^{th}$ word.

In this case, the M may be equal to or less than a number of words included in the logic group 1.

Where the M is equal to the number of words included in the logic group 1, the lookup table (1) 920 may store information corresponding to every word included in the logic group 1. Where the M is less than the number of words included in the logic group 1, the lookup table (1) 920 may select several words among words included in the logic group 1 and merely store information corresponding to the selected words.

In this case, the lookup table (1) 920 may select several words included in the logic group 1 based on spatial and/or temporal locality.

The temporal locality is a tendency where data accessed once is accessed again in a short time period, and the lookup table (1) 920 may store, to any one entry among entries, information corresponding to a word accessed in a near time.

Where the host or process accesses a word included in the logic group 1, the lookup table (1) 920 may store, to one entry among entries, information corresponding to the accessed word.

The spatial locality is a tendency where the host or processor refers to data stored in a nearby location of read data. Where the host and processor accesses a word included in the logic group 1, the lookup table (1) 920 may store, to one entry among entries, information corresponding to words being adjacent to the accessed word.

To verify whether information corresponding to a target word of accessing is stored in the lookup table (1) 920, the memory device 900 may compare every offset field of entries stored in the lookup table (1) 920 with an offset of the target word. In this case, every offset field of entries of the lookup table (1) 920 may be a Content Addressable Memory (CAM).

Figure 12:
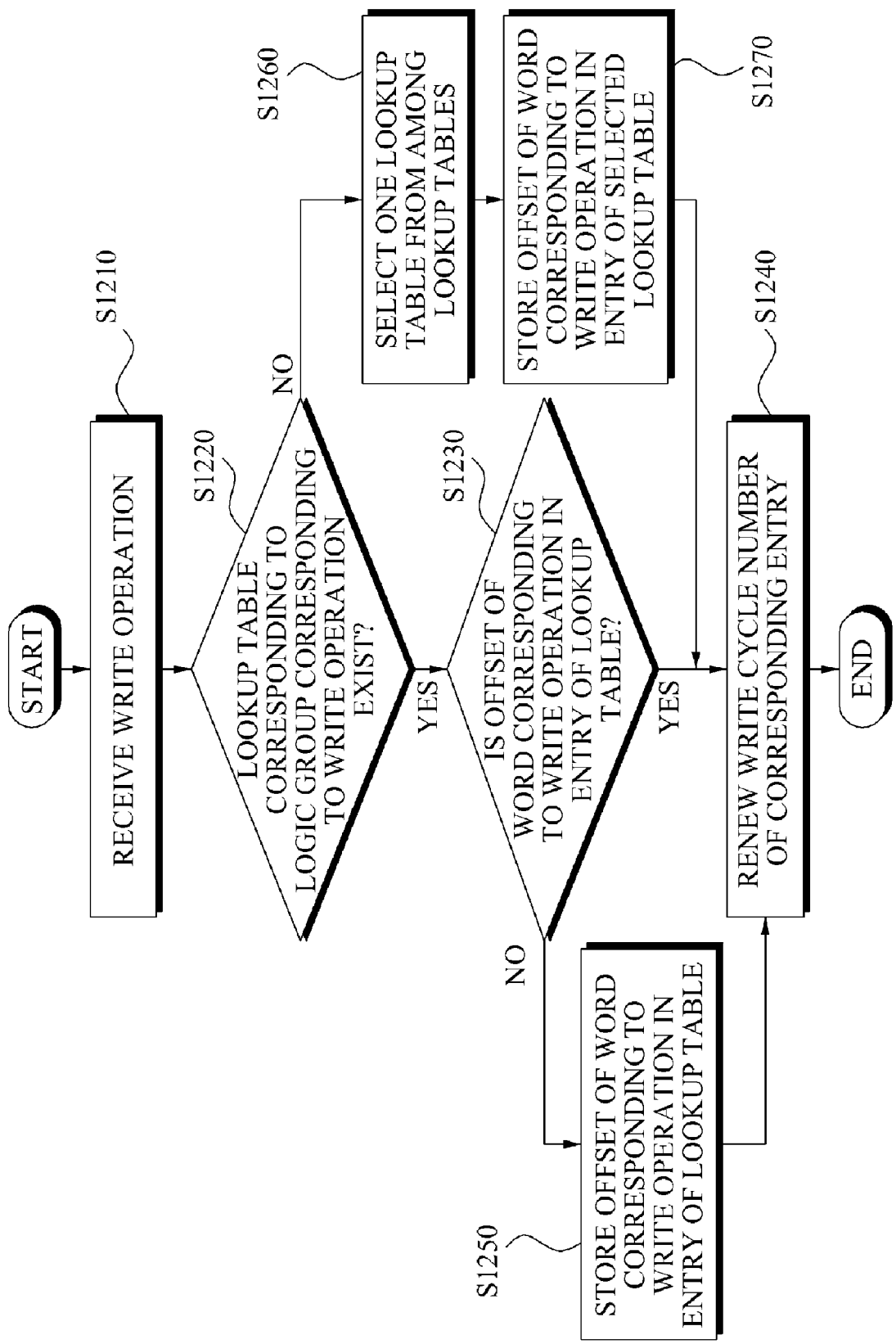
FIG. 12 is a flowchart illustrating an example of a management method performed in the memory device of FIG. 9 according to an exemplary embodiment.

FIG. 12 is a flowchart illustrating a management method performed in the memory device 900 of FIG. 9 according to an exemplary embodiment.

Referring to FIG. 12, the management method receives a write operation in operation S1210.

The management method of FIG. 12 may verify whether a lookup table corresponding to a logic group corresponding to the write operation exits in operation S1220.

Where the result of the verifying in operation S1220 is positive, the management method may verify whether an offset of a word corresponding to the write operation exists in an entry of the lookup table in operation S1230. In this case, the lookup table is a lookup table corresponding to the logic group to the write operation.

Where the result of the verifying in operation S1230 is positive, the management method may renew a write cycle number of the entry.

Where the result of the verifying in operation S1230 is negative, the management method may store the offset of the word corresponding to the write operation in the entry of the lookup table in operation S1250.

Figure 13:
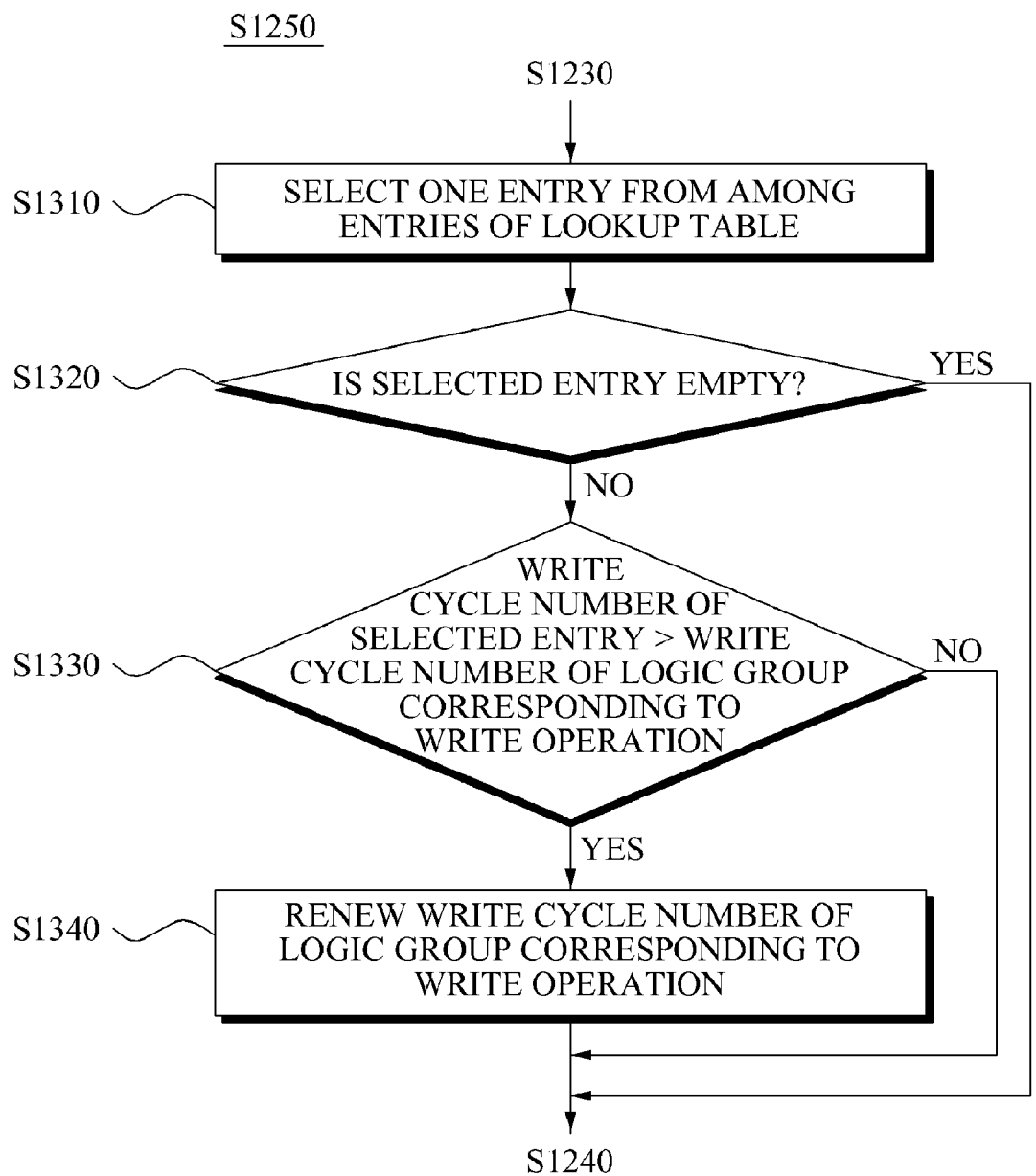
FIG. 13 is a flowchart illustrating an example operation of storing an offset of a word corresponding to a write operation in an entry of a lookup table of FIG. 12 according to an exemplary embodiment.

FIG. 13 is a flowchart illustrating the operation S1250 of FIG. 12 in detail.

Referring to FIG. 13, the management method selects any one entry among entries of a lookup table corresponding to a write operation in operation S1310. In this case, the management method may select the entry based on a random sequence or based on temporal and/or spatial locality.

In operation S1320, the management method verifies whether the selected entry is empty.

Where the result of the verifying in operation S1320 is negative, the management method verifies whether a write cycle number of the selected entry is higher than a maximum write cycle number of a logic group corresponding to the write operation in operation S1330. In this case, the maximum write cycle number of the logic group corresponding to the write operation may be information stored as metadata.

Where the result of the verifying in operation S1330 is positive, the management method renews the maximum write cycle number of the logic group corresponding to the write number in operation S1340. In this case, the management method may set a write cycle number stored in the selected entry as the maximum write cycle number of the logic group corresponding to the write operation. The management method may store the newly set maximum write cycle number as metadata. The management method may manage a write cycle number of each logic group as metadata.

Where the result of the verifying in operation S1320 is positive, the manage method may perform the operation S1240 of FIG. 12. Also, where the result of the verifying in operation S1330 is negative, the management method may perform the operation S1240 of FIG. 12.

Referring to FIG. 12 again, the management method may perform the operation S1240 after performing the operation S1250. In this case, the management method may store a value of adding one to the newly set maximum write cycle number of the logic group corresponding to the write operation in the selected entry.

Where the result of the verifying in operation S1220 is negative, the management method selects one of lookup tables in operation S1260. In this case, the management method may select the lookup table based the random sequence or based on temporal and/or spatial locality.

The management method of FIG. 12 may select a lookup table based on a First In First Out (FIFO) algorithm or based on a heuristic verification criterion. The management method may select the lookup table based on the write cycle number of Least Recently Used (LRU) verification criterion.

The management method of FIG. 12 stores an offset of a word corresponding to the write operation in an entry of the selected lookup table in operation S1270.

The management method may perform the operation S1240, after performing the operation S1270.

Figure 14:
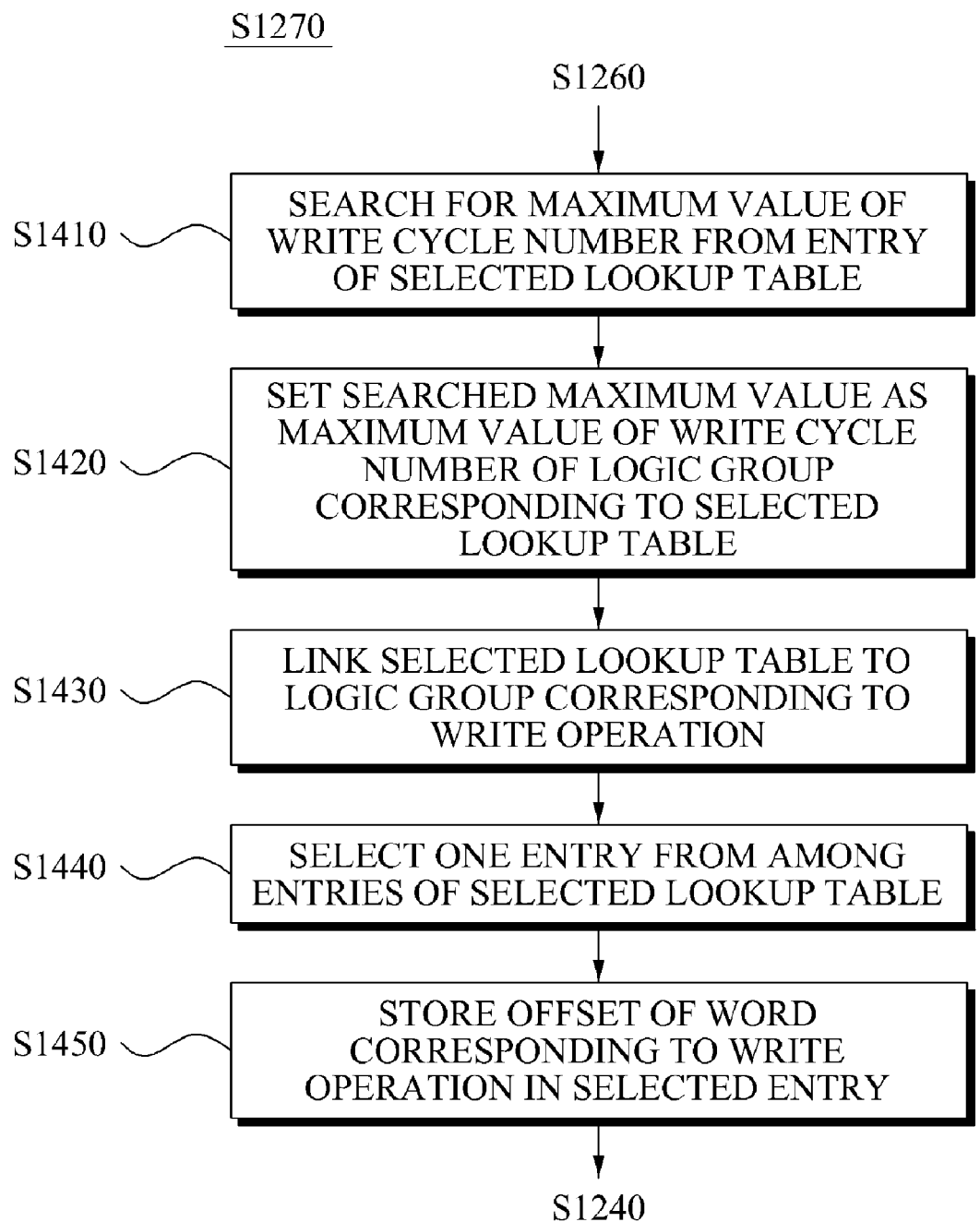
FIG. 14 is a flowchart illustrating an example operation of storing an offset of a word corresponding to a write operation in an entry of a selected lookup table of FIG. 12 according to an exemplary embodiment.

FIG. 14 is a flowchart illustrating the operation S1270 of FIG. 12 in detail.

Referring to FIG. 14, the management method searches to find a maximum value from entries of a selected lookup table in operation S1410.

In operation S1420, the management method sets the retrieval maximum value as a maximum value of a write cycle number of a logic group corresponding to the selected lookup table. In this case, the management method may store the set maximum value as metadata with respect to the logic group. The management method may perform backup of information with respect to the logic group corresponding to the selected lookup table as metadata.

In operation S1430, the management method links the selected lookup table to a logic group corresponding to a write operation. The logic group corresponding to the write operation may newly correspond to the selected lookup table instead of the formal logic group which corresponds to the selected lookup table.

In operation S1440, the management method selects one of entries of the selected lookup table.

In operation S1450, the management method stores an offset of a word corresponding to the write operation in the selected entry.

After performing the operation S1450, the management method may perform the operation S1240 of FIG. 12. In this case, the management method may store a value of adding one to the maximum write cycle number of the logic group corresponding to the write operation in the entry storing the offset.

The methods described above including a method of managing a memory device may be recorded, stored, or fixed in one or more computer-readable media that includes program instructions to be implemented by a computer to cause a processor to execute or perform the program instructions. The media may also include, alone or in combination with the program instructions, data files, data structures, and the like. The media and program instructions may be those specially designed and constructed for the purposes of exemplary embodiments, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above.

Flash memory devices and/or memory controllers according to exemplary embodiments may be embodied using various types of packages. For example, the flash memory devices and/or memory controllers may be embodied using packages such as Package on Packages (PoPs), Ball Grid Arrays (BGAs), Chip Scale Packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Quad Flatpack (QFP), Small Outline Integrated Circuit (SOIC), Shrink Small Outline Package (SSOP), Thin Small Outline (TSOP), Thin Quad Flatpack (TQFP), System In Package (SIP), Multi Chip Package (MCP), Wafer-level Fabricated Package (WFP), Wafer-Level Processed Stack Package (WSP), and the like.

The flash memory devices and/or the memory controllers may include memory cards. In this case, the memory controllers may be constructed to communicate with an external device for example, a host using any one of various types of protocols such as a Universal Serial Bus (USB), a Multi Media Card (MMC), a Peripheral Component Interconnect-Express (PCI-E), Serial Advanced Technology Attachment (SATA), Parallel ATA (PATA), Small Computer System Interface (SCSI), Enhanced Small Device Interface (ESDI), and Integrated Drive Electronics (IDE).

The flash memory devices may be non-volatile memory devices that may maintain stored data even when power is cut off. According to an increase in the use of mobile devices such as a cellular phone, a personal digital assistant (PDA), a digital camera, a portable game console, and an MP3 player, the flash memory devices may be more widely used as data storage and code storage. The flash memory devices may be used in home applications such as a high definition television (HDTV), a digital video disk (DVD), a router, and a Global Positioning System (GPS).

A computing system according to exemplary embodiments may include a microprocessor that is electrically connected with a bus, a user interface, a modem such as a baseband chipset, a memory controller, and a flash memory device. The flash memory device may store N-bit data via the memory controller. The N-bit data is processed or will be processed by the microprocessor and N may be 1 or an integer greater than 1. Where the computing system is a mobile apparatus, a battery may be additionally provided to supply operation voltage of the computing system.

It will be apparent to those of ordinary skill in the art that the computing system according to exemplary embodiments may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

According to certain embodiments discussed above, a memory device may be provided that may simplify a condition that may be required to be considered when a host or controller performs a garbage collection.

A memory device may also be provided that may reduce a load for managing a memory of a host or controller.

A memory device may also be provided that may reduce a time taken for performing a garbage collection.

A memory device may also be provided that may reduce a number of copy operations while performing the garbage collection.

A memory device may also be provided that may reduce a number of blocks required when performing the garbage collection.

A memory device may also be provided that may reduce a number of garbage collections to be performed.

A memory device may also be provided that may reduce an unit considered when performing a wear-leveling, thereby increasing accuracy of the wear-leveling.

A memory device may also be provided that may reduce an overhead required when managing the wear-leveling.

A memory device may also be provided that may perform a wear-leveling optimized to a Non-volatile Random Access Memory (NVRAM).

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A memory device, comprising:
    a non-volatile flash memory comprising a plurality of blocks including a plurality of pages; and
    a non-volatile address translation memory to receive an external physical address, to translate the external physical address into an internal physical address, and to access one page of the plurality of pages using the internal physical address,
    wherein the address translation memory comprises a plurality of entries to access one entry of the plurality of the entries using the external physical address and to generate an internal physical address corresponding to the external physical address referring to contents stored in the accessed entry.

2. The memory device of claim 1, wherein the address translation memory stores an internal physical address corresponding to the one page of the plurality of pages in each of the plurality of entries.

3. The memory device of claim 1, wherein a number of the plurality of entries is determined based on a number of pages that one block includes.

4. The memory device of claim 1, wherein the memory device
    receives a write operation, stores the write operation in an empty page among the plurality of pages, and
    updates, to an internal physical address of a page where data of the write operation is stored, contents stored in an entry accessed using an external physical address of the write operation.

5. The memory device of claim 4, wherein the memory device updates the content stored in the entry accessed using the external physical address of the write operation in parallel with storing the write operation page data in the empty page.

6. The memory device of claim 2, wherein the memory device
    receives a read operation from a host or controller, reads an internal physical address stored in an entry accessed using an external physical address of the read operation,
    reads data stored in a page corresponding to the read internal physical address among the plurality of pages, and
    outputs the read data to the host or controller.

7. The memory device of claim 6, wherein the memory device accesses the non-volatile memory in parallel with accessing an entry of the address translation memory.

8. The memory device of claim 1, wherein the memory device erases an entry corresponding to a block to be erased from among entries of the address translation memory in response to receiving an erase operation to perform erasing of at least one block from among the plurality of blocks.

9. The memory device of claim 8, wherein the memory device erases an entry corresponding to the block to be erased in parallel with erasing at least one block from among the plurality of blocks.

10. The memory device of claim 1, wherein the address translation memory is a non-volatile memory that is randomly accessible in byte units or word units.

11. The memory device of claim 1, wherein:
each of the plurality of pages is a set of memory cells where data is simultaneously programmed; and
each of the plurality of blocks is a set of memory cells from which data is simultaneously erased.

12. A memory device, comprising:
a non-volatile data memory that is randomly accessible in word units,
wherein the data memory is divided into at least one logic group, each of the at least one logic group including a plurality of words, and statistical information is managed with respect to each of the at least one logic group, the statistical information including a write cycle number of each of the words included in each of the at least one logic group.

13. The memory device of claim 12, wherein the statistical information includes a mean, a maximum value, and a deviation of write cycle numbers of the words included in each of the at least one logic group.

14. The memory device of claim 12, wherein the memory device
selects a first logic group having a highest mean of write cycle numbers of included words among the at least one logic group,
selects a second logic group having a lowest mean of write cycle numbers of included words among the at least one logic group, and
exchanges data and address between the first logic group and second logic group.

15. The memory device of claim 12, wherein the memory device
selects a first logic group having a lowest deviation between write cycle numbers of included words among the at least one logic group,
selects a second logic group having a highest deviation between write cycle numbers of included words, and
exchanges an address and data between the first logic group and second logic group.

16. The memory device of claim 12, wherein the memory device
selects a first logic group having a highest maximum value of write cycle numbers of included words among the at least one logic group,
selects a second logic group having a lowest maximum value of write cycle numbers of included words among the at least one logic group, and
exchanges data and an address between the first logic group and the second logic group.

17. The memory device of claim 12, further comprising at least one lookup table,
wherein the at least one lookup table corresponds to any one logic group of the at least one logic group and includes at least one entry storing an offset and a write cycle number of at least one word of the words included in the corresponding logic group, the offset indicating a relative address of each of the at least one word in the corresponding logic group.

18. The memory device of claim 17, wherein the offset updates the stored write cycle number in response to one of the at least one lookup table corresponding to a logic group corresponding to a write operation and an offset of a word corresponding to the write operation being stored in the corresponding lookup table.

19. The memory device of claim 17, wherein the memory device
selects one of entries of the corresponding lookup table,
stores the offset of the word corresponding to a write operation in the selected entry, and
stores a value of adding one to a maximum value of write cycle numbers of the logical group corresponding to the write operation in the selected entry, in response to one of the at least one lookup table corresponding to a logic group corresponding to a write operation and an offset of a word corresponding to the write operation being not stored in the corresponding lookup table.

20. The memory device of claim 19, wherein the memory device
selects one entry of entries of the corresponding lookup table based on a random sequence or spatial/temporal locality, and
sets a write cycle number stored in the selected entry as a maximum write cycle number of the logic group corresponding to the write operation in response to the selected entry being not empty and the write cycle number stored in the selected entry being higher than the maximum write cycle number of the logic group corresponding to the write operation.

21. The memory device of claim 17, wherein, in response to a lookup table corresponding to a logic group corresponding to a write operation not existing among the at least one lookup table, the memory device
selects one lookup table of the at least one lookup table,
sets a maximum write cycle number stored in an entry of the selected lookup table as a maximum write cycle number of a logical group corresponding to the selected lookup table,
sets the selected lookup table to be corresponding to the logic group of the write operation,
stores an offset of a word corresponding to the write operation in the selected lookup table, and
stores a value of adding one to the maximum write cycle number of the logical group corresponding to the write operation in an entry storing the offset.

22. The memory device of claim 17, wherein a number of the at least one lookup table is equal to or less than a number of the at least one logic group, and
a number of entries of each of the at least one lookup table is equal to or less than a number of words included in each of the at least one logic group.

23. The memory device of claim 12, wherein the memory device stores the statistical information related to the write cycle number of each of the words included in each of the at least one logic group as metadata with respect to each of the at least one logic group.

24. The memory device of claim 1, wherein the internal physical address used to access the one page is different from an internal physical address used to access another page.

* * * * *